(12) United States Patent
Baraga et al.

(10) Patent No.: US 8,955,316 B2
(45) Date of Patent: Feb. 17, 2015

(54) DRIVE TRAIN DEVICE

(75) Inventors: Michael Baraga, Stuttgart (DE); Gerd Jäggle, Burgstetten (DE); Steffen Henzler, Böbingen (DE)

(73) Assignee: Daimler AG, Stuttgart (DE)

( * ) Notice: Subject to any disclaimer, the term of this patent is extended or adjusted under 35 U.S.C. 154(b) by 665 days.

(21) Appl. No.: 13/373,108

(22) Filed: Nov. 4, 2011

(65) Prior Publication Data
US 2012/0055146 A1 Mar. 8, 2012

Related U.S. Application Data

(63) Continuation-in-part of application No. PCT/EP2010/001758, filed on Mar. 20, 2010.

(30) Foreign Application Priority Data

May 5, 2009 (DE) .......................... 10 2009 019 959

(51) Int. Cl.
 *F16D 33/18* (2006.01)
 *F16H 61/00* (2006.01)
 F16H 57/04 (2010.01)
(52) U.S. Cl.
 CPC ........ F16H 61/0031 (2013.01); *F16H 57/0441* (2013.01); *F16H 57/0446* (2013.01); *F16H 2061/0037* (2013.01)
 USPC .................... 60/421; 60/422; 60/430; 60/456
(58) Field of Classification Search
 CPC ............ F16H 57/0441; F16H 57/0446; F16H 2061/0037; F16H 61/0031

USPC ........... 60/330, 337, 339, 347, 396, 431, 456, 60/428–430, 358, 420, 421, 422; 251/42
See application file for complete search history.

(56) References Cited

U.S. PATENT DOCUMENTS

| 4,049,017 | A | * | 9/1977 | Jones ............................ 137/540 |
| 2006/0086088 | A1 | * | 4/2006 | Pfaff ............................... 60/420 |
| 2007/0240919 | A1 | | 10/2007 | Carlson | |
| 2008/0087014 | A1 | * | 4/2008 | Schick et al. ................... 60/403 |
| 2009/0071142 | A1 | | 3/2009 | Kumazaki et al. | |
| 2009/0096307 | A1 | | 4/2009 | Tsutsumi et al. | |

FOREIGN PATENT DOCUMENTS

| DE | 41 34 268 | | 4/1992 |
| DE | 10327406 | A1 * | 2/2005 |
| DE | 10 2008 008 454 | | 9/2008 |

(Continued)

*Primary Examiner* — Ned Landrum
*Assistant Examiner* — Logan Kraft
(74) *Attorney, Agent, or Firm* — Klaus J. Bach

(57) ABSTRACT

In a drive train device, in particular a motor vehicle drive train device, with a working fluid pressure system for providing an operating fluid pressure including at least a first and a second operating fluid pressure source connected in at least one operating state directly to the working fluid pressure system, and a lubricating and cooling fluid pressure system with an operating fluid pressure deviating from the operating fluid pressure in the working fluid pressure system, a hydraulic switching unit is provided which in at least one operating state connects the second operating fluid pressure source directly to the lubricating and cooling fluid pressure system for increasing the pressure thereof.

13 Claims, 1 Drawing Sheet

(56) References Cited

FOREIGN PATENT DOCUMENTS

| | | |
|---|---|---|
| EP | 1 316 727 | 6/2003 |
| JP | 2002 206630 | 7/2002 |
| JP | 2005 090659 | 4/2005 |
| JP | 2007170462 | 5/2007 |
| JP | 2008 069837 | 3/2008 |
| JP | 2008 267505 | 11/2008 |
| WO | WO 03/087627 | 10/2003 |
| WO | WO 2007/096719 | 8/2007 |
| WO | WO 2008/005202 | 5/2008 |

* cited by examiner

DRIVE TRAIN DEVICE

This is a continuation-In-Part application of pending international patent application PCT/EP2010/001758 filed Mar. 20, 2010 and claiming the priority of German patent application 10 2009 019 959.4 filed May 5, 2009.

BACKGROUND OF THE INVENTION

The invention relates to a drive train device with an operating fluid having first and second operating fluid pressure sources connected to a working fluid pressure system and a lubricating and cooling fluid pressure system to which the second operating fluid pressure source can be connected in a particular operating state to the lubricating and cooling fluid pressure system.

DE 41 34 268 A1 already discloses a drive train device, in particular a motor vehicle drive train device with a working fluid pressure system which is provided for an operating fluid pressure and with at least a first and a second operating fluid pressure source which are respectively directly connected to the working pressure system in at least one operating state.

JP 2007 170462 A1 describes a drive train device with two operating fluid sources in the form of two pumps. A first pump driven by an internal combustion engine is connected to a working pressure system. A second pump driven by an electric motor can also be connected to the working pressure system by way of a non-return valve. This is the case when the internal combustion engine which drives the first pump is not in operation. The second pump can also supply oil into a cooling pressure system by means of a valve. The valve is thereby designed so that it opens and closes independently of a pressure in the working pressure system.

It is an object of the invention to increase operating reliability of such a drive train device.

SUMMARY OF THE INVENTION

In a drive train device, in particular a motor vehicle drive train device, with a working fluid pressure system for providing an operating fluid pressure including at least a first and a second operating fluid pressure source connected in at least one operating state directly to the working fluid pressure system, and a lubricating and cooling fluid pressure system with an operating fluid pressure deviating from the operating fluid pressure in the working fluid pressure system, a hydraulic switching unit is provided which in at least one operating state connects the second operating fluid pressure source directly to the lubricating and cooling fluid pressure system for increasing the operating fluid supply to the lubricating and cooling fluid pressure system.

The drive train device comprises a hydraulic switching unit which is provided to connect in at least one operating state the second operating fluid pressure source directly to the lubricating and cooling fluid pressure system. Support for a supply of the lubricating and cooling fluid pressure system can thereby be improved through the second operating fluid pressure source, whereby the size of the first operating fluid pressure source which is advantageously in the form of an operating fluid pump can be reduced. In particular with a high operating fluid pressure in the working fluid pressure system the second operating fluid pressure source can directly supply the lubricating and cooling pressure fluid system with operating fluid, whereby under-supply of the lubricating and cooling fluid pressure system can be advantageously avoided. By means of the switching unit an operating reliability of the drive train device can thus be increased. A "working fluid pressure system" is to be understood in particular to be a system comprising hydraulic operating fluid lines which are hydraulically connected to each other and which have in a hydrostatic operating state essentially the same pressure. The working fluid pressure system is preferably provided to supply hydraulic actuators of the drive train device such as for example actuators for connecting couplings and/or brakes. A "lubricating and cooling fluid pressure system" is to be understood in particular to be a further system comprising hydraulic operating fluid lines which is separated in principle from the working fluid pressure system. A "hydraulic switching unit" is to be understood in particular to be a unit which is provided to change and/or adjust an operating fluid pressure and/or an operating fluid interconnection. "Provided" is to be understood in particular as specially formed and/or equipped.

According to the invention the hydraulic switching unit comprises a switching valve which is provided to connect the second operating fluid pressure source in dependence upon an operating fluid pressure in the working fluid pressure system directly to the lubricating and/or cooling fluid pressure system. The direct connection of the second operating fluid pressure source with the lubricating and/or cooling fluid pressure system can thereby be switched advantageously in dependence upon the current operating state, whereby in particular constant pressure conditions can be achieved for a drive train device with a converter unit.

It is further proposed that the switching valve should be provided to connect the second operating fluid pressure source permanently directly to the working fluid pressure system. The second operating fluid pressure source can thereby feed operating fluid to the working fluid pressure system independently of a switching position of the switching valve, whereby the first operating fluid pressure source can be advantageously relieved.

In a particularly advantageous embodiment the switching valve is provided to connect the second operating fluid pressure source directly to the lubricating and cooling fluid pressure system in a switchable manner. According to requirements it is thereby possible to switch between the working fluid pressure system and the lubricating and cooling fluid pressure system and thus for the support of the first operating fluid pressure source to be advantageously adapted to a momentary operating state.

It is advantageous in particular if the switching valve is adapted to switch independently. An expensive control for the switching unit, for example by means of an electric and/or electronic control or regulating unit, can thereby be omitted, whereby a compact and simple embodiment is possible. "Independently" is to be understood in particular in that the switching valve is independent from an external energy supply such as for example an electrical energy supply. An "external energy supply" is to be understood to be an energy supply other than a hydraulic energy supply. The switching valve advantageously switches independently in dependence upon the operating fluid pressure in the working pressure system, whereby a defined threshold pressure for switching of the switching valve amounts to 15 bar for example.

It is further advantageous if the switching unit comprises a valve spring adjusting means for adjusting a threshold pressure for switching the switching valve. Tolerances which are caused for example during production of the switching valve can thereby be advantageously compensated and the defined threshold pressure for switching the switching valve can be easily adjusted.

In a further embodiment of the invention it is proposed that the switching unit should comprise at least one non-return valve arranged between the working pressure system and the switching valve, which non-return valve prevents an operating fluid flow in the direction of the switching valve. A backflow of the operating fluid from the working pressure system into the switching valve can thereby be prevented, whereby both an operating fluid flow from the working pressure system into the second operating fluid pressure source and also into the lubricating and/or cooling pressure system can be avoided. In principle a switching valve can also be used as an alternative to the non-return valve.

It is advantageous in particular if the switching unit comprises at least one non-return valve arranged between the lubricating and cooling fluid pressure system and the switching valve, which non-return valve prevents an operating fluid flow in the direction of the switching valve. A backflow of the operating fluid from the lubricating and cooling fluid pressure system into the switching valve can thereby be prevented, whereby both an operating fluid flow from the lubricating and cooling pressure system to the second operating fluid pressure source and also to the working fluid pressure system can be avoided. In principle the second non-return valve can also be replaced by a switching valve.

It is also advantageous if the second operating fluid pressure source is an independently driven operating fluid pump which is provided to provide a controllable operating fluid pressure. The second operating fluid pressure source can thereby be adjusted in particular independently of the first operating fluid pressure source and provide operating fluid.

It is also proposed that the drive train device should comprise a control or regulating unit for adjusting the operating fluid pressure of the second operating fluid pressure source in dependence on a requirement performance graph. An appropriate operation of the second operating fluid source independently of the first operating fluid source can thereby be achieved.

In a further embodiment of the invention it is proposed that the control unit should be provided to adapt the requirement performance graph in relation to a status change to the lubricating and cooling fluid pressure system. The lubricating and cooling fluid pressure system can thereby be advantageously adapted to status changes such as for example wear and/or tolerance fluctuations.

It is further proposed that the drive train device comprises a sensor unit providing a parameter for adapting the requirement performance graph. The control unit can thereby advantageously adapt the requirement performance graph to changes, for example wear-related changes.

In a further embodiment it is proposed that the drive train device comprises a further hydraulic switching unit for supplying an operating fluid excess quantity of the working fluid pressure system to the lubricating and cooling fluid pressure system. A reliable operating fluid pressure can thereby be provided in the working fluid pressure system. An "operating fluid excess quantity of the working fluid pressure system" is to be understood in particular to be an operating fluid quantity which is incorporated into the working fluid pressure system in addition to an operating fluid requirement of the actuators which are supplied by means of the working fluid pressure system. In particular an operating fluid quantity is to be understood which is not required in the working fluid pressure system.

The drive train device advantageously further comprises a hydraulic lubricating fluid pressure regulating valve connecting a lubricating and cooling fluid low pressure system to the lubricating and cooling fluid pressure system. An advantageously constant operating fluid pressure can thereby be established in the lubricating and cooling fluid low pressure system.

The invention and advantageous embodiments thereof will become more readily apparent from the following description on the basis of the accompanying drawings which show an exemplary embodiment of the invention. The drawings, the description and the claims contain numerous features in combination. The person skilled in the art will usefully also consider the features individually and put them together to form meaningful further combinations.

DESCRIPTION OF A PARTICULAR EMBODIMENT

Figure 1:
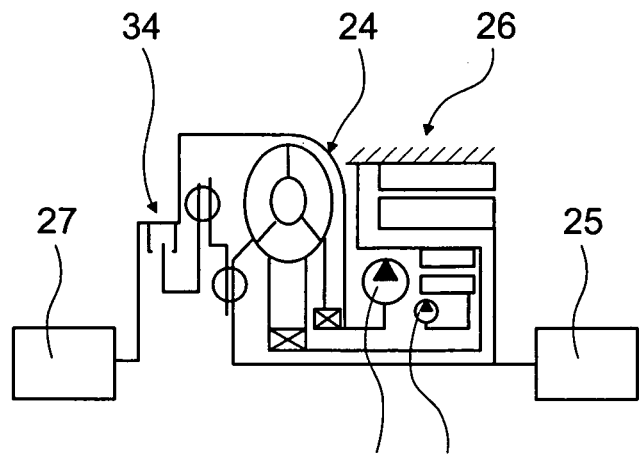
FIG. 1 shows a drive train device for a motor vehicle and
FIG. 2 shows schematically, a working fluid pressure system and a lubricating and cooling fluid pressure system for the drive train device of FIG. 1.

FIG. 1 shows an exemplary drive train device. The drive train device is in the form of a motor vehicle drive train device. The drive train device comprises a torque converter unit 24 and a transmission unit 25. In addition the drive train device comprises a hybrid drive unit 26. The hybrid drive unit 26 is arranged in a power flow between an internal combustion engine 27 and the transmission unit 25. The hybrid drive unit 26 provides a boost mode, a recuperation mode and an electric drive mode.

Figure 2:
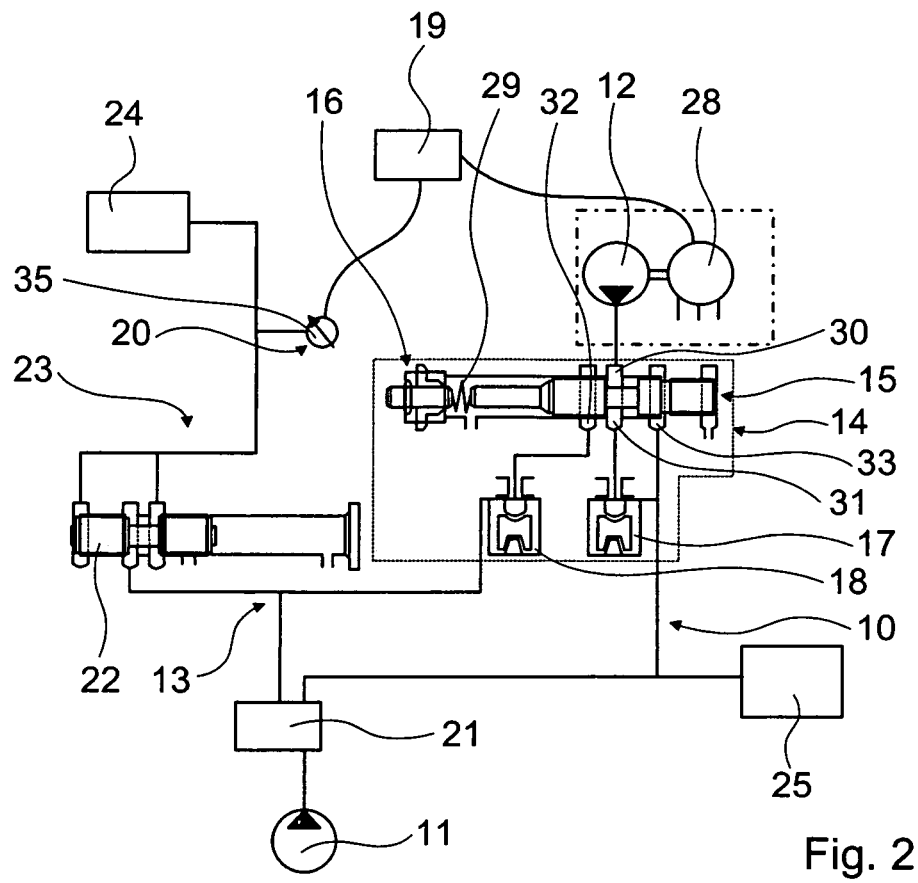

In order to change gears the transmission unit 25 comprises hydraulically actuated gear changing units which are not described in detail. The drive train device comprises a working pressure fluid system 10 with operating fluid lines which are hydraulically connected to each other and which comprise in a hydrostatic operating state an essentially equal operating fluid pressure (cf FIG. 2). In order to actuate the gear shifting unit the gear unit 25 comprises hydraulic actuators which can be subjected to an operating fluid pressure by means of the working pressure system 10. The gear shifting units are in the form of clutches or brakes.

In addition the drive train device comprises a lubricating and cooling fluid pressure system 13. The lubricating and cooling fluid pressure system 13 comprises operating fluid lines hydraulically connected to each other which have an essentially equal operating fluid pressure in a hydrostatic operating state. The lubricating and cooling fluid pressure system 13 and the working fluid pressure system 10 can be hydraulically decoupled from each other. The operating fluid pressure of the lubricating and cooling fluid pressure system 13 and the operating fluid pressure of the working fluid pressure system 10 can deviate from each other. The lubricating and cooling fluid pressure system 13 supplies the converter unit 24 and the transmission unit 25 with the operating fluid which serves as a lubricating and cooling fluid and a pressure fluid. In addition the lubricating and cooling fluid pressure system 13 supplies fluid to a converter bridging clutch 34 of the torque converter unit 24.

The drive train device further comprises a lubricating and cooling fluid low pressure system 23. The lubricating and cooling fluid low pressure system 23 comprises operating fluid lines which are interconnected hydraulically and which are also connected directly via a lubricating or cooling fluid line to the components to be lubricated or cooled, such as for example the torque converter unit 24, the transmission unit 25 and the converter bridging clutch 34. The lubricating and cooling low pressure fluid system 23 additionally provides an actuating pressure for the converter bridging clutch 34. The lubricating and cooling low pressure fluid system 23 is connected by means of a hydraulic lubricating fluid pressure regulating valve 22 to the lubricating and cooling pressure system 13. The lubricating fluid pressure regulating valve 22 adjusts an operating fluid pressure in the lubricating and cooling low pressure system 23.

In order to provide the operating fluid pressure in the working fluid pressure system 10 and the operating fluid pressure in the lubricating and cooling fluid pressure system 13 the drive train device comprises a first operating fluid pressure source 11 and a second operating fluid pressure source 12. The first operating fluid pressure source 11 is a main pump and provides a basic supply of operating fluid for the working fluid pressure system 10. The first operating fluid pressure source 11 is driven by the internal combustion engine 27 or the hybrid drive unit 26. The first operating fluid pressure source 11 is permanently connected to the internal combustion engine 27 and/or the hybrid drive unit 26. An operating fluid pressure provided by the first operating fluid pressure source 11 depends upon the speed of the internal combustion engine 27 or the hybrid drive unit 26 respectively.

The second operating fluid pressure source 12 is formed as an additional pump which is provided in certain operating states for supporting the first operating fluid pressure source 11. The second operating fluid pressure source 12 is an independently driven operating fluid pump which can be controlled independently of the first operating fluid pressure source 11. The second operating fluid pressure source 12 comprises an electric motor 28, by means of which an operating fluid pressure provided by the second operating fluid pressure source 12 can be adjusted. The operating fluid pressure of the second operating fluid pressure source 12 is adjusted by controlling the speed of the motor 28.

In order to adjust the operating fluid pressure in the working fluid pressure system 10 the drive train device comprises a merely schematically shown first hydraulic switching unit 21 which is directly connected to the first operating fluid pressure source 11. The switching unit 21 connects the first operating fluid pressure source 11 permanently with the working fluid pressure system 10, whereby the operating fluid pressure in the working fluid pressure system 10 corresponds essentially to the operating fluid pressure provided by the first operating fluid pressure source 11. In addition the first switching unit 21 is provided to convey an operating fluid excess quantity existing in the working fluid pressure system 10 to the lubricating and cooling fluid pressure system 13.

The drive train device further comprises a second hydraulic switching unit 14 which is directly connected to the second operating fluid pressure source 12. In a first operating state, the switching unit 14 connects the second operating fluid pressure source 12 directly to the working fluid pressure system 10. In a second operating state the switching unit 14 connects the second operating fluid pressure source 12 directly to the working fluid pressure system 10 and to the lubricating and cooling fluid pressure system 13.

In order to connect the second operating fluid pressure source 12 to the working fluid pressure system 10 or the lubricating and cooling fluid pressure system 13 the switching unit 14 comprises a switching valve 15 in the form of a 3/2 directional valve. The switching valve 15 is a proportional valve which connects the second operating fluid pressure source 12 in a first switching position directly to the working fluid pressure system 10 and in a second switching position directly to the lubricating and cooling fluid pressure system 13 and the working fluid pressure system 10. An actuator of the switching valve 15 is in the form of a hydraulic actuator. The actuator is connected to the working fluid pressure system 10. The actuator switches the switching valve 15 in dependence on the operating fluid pressure in the working pressure fluid system 10 which depends essentially on the first operating fluid pressure source 11 in the working fluid pressure system 10.

The switching valve 15 comprises a valve piston which is provided in a valve region to form the directional valve. In order to form the actuator the valve piston comprises a pressure volume. In order to adjust a switching position the switching valve comprises a spring means 29 which is arranged complementarily to the pressure volume. The switching valve 15 comprises four operating fluid connections 30, 31, 32, 33. The first operating fluid connection 30 of the switching valve 15 is connected directly to the second operating fluid pressure source 12. The second operating fluid connection 31 of the switching valve 15 is provided for connection to the working fluid pressure system 10. The third operating fluid connection 32 of the switching valve 15 is provided for connection to the lubricating and cooling fluid pressure system 13. The pressure volume for the actuator is connected to the operating fluid connection 33 which is directly connected to the working fluid pressure system 10.

For adjustment of the switching valve 15 the switching valve 15 comprises a valve spring adjusting means 16. The valve spring adjusting means 16 is arranged effectively between a valve housing and the spring means 29. By means of the valve spring adjusting means 16 a pre-tensioning of the spring means 29 can be adjusted. As the spring means 29 is arranged complementarily to the pressure volume a threshold pressure is set via the pre-tensioning of the spring means 29, above which threshold pressure the switching valve 15 switches into the second switching position, in which it connects the second operating fluid pressure source 12 directly to the lubricating and cooling fluid pressure system 13 and the working fluid pressure system 10. In order to adjust different threshold pressures the valve spring adjusting means 16 comprises an adjusting disc, which has a suitable thickness. In order to adjust the threshold pressures the adjusting disc can be exchanged for another adjusting disc. In the exemplary embodiment the threshold pressure is adjusted by means of the valve spring adjusting means 16 and the tensioning of the spring means 29 amounts to 15 bar.

In an operating state in which an operating fluid pressure in the pressure volume exceeds the threshold pressure the switching valve 15 switches automatically from the first switching position to the second switching position, in which three operating fluid connections 30, 31, 32 of the switching valve 15 are connected to each other. In an operating state in which the operating fluid pressure in the pressure volume is smaller than the threshold pressure the switching valve 15 switches automatically from the second switching position to the first switching position, in which merely the two operating fluid connections 30, 31 of the switching valve 15 are connected to each other.

The hydraulic switching unit 14 further comprises two hydraulic non-return valves 17, 18 of similar construction. The first non-return valve 17 is arranged between the switching valve 15 and the working fluid pressure system 10. The second non-return valve 18 is arranged between the switching valve 15 and the lubricating and cooling fluid pressure system 13.

The first non-return valve 17 prevents an operating fluid flow from the working fluid pressure system 10 in the direction of the switching valve 15. In an operating state in which an operating fluid pressure at the second operating fluid pressure connection 31 of the switching valve 15 exceeds the operating fluid pressure of the working fluid pressure system 10, the first non-return valve 17 opens and connects the second operating fluid connection 31 to the working fluid pressure system 10. In an operating state in which the operating fluid pressure of the working fluid pressure system 10 exceeds the operating fluid pressure at the second operating fluid pressure connection 31 of the switching valve 15 the non-return valve 17 closes and separates the operating fluid pressure connection 31 and the working fluid pressure system 10 from each other.

The second non-return valve 18 prevents an operating fluid flow from the lubricating and cooling fluid pressure system 13 in the direction of the switching valve 15. In an operating state in which an operating fluid pressure at the third operating fluid pressure connection 32 of the switching valve 15 exceeds the operating fluid pressure of the lubricating and cooling fluid pressure system 13 the second non-return valve 18 opens and connects the third operating fluid connection 32 to the lubricating and cooling fluid pressure system 13. In an operating state in which the operating fluid pressure of the lubricating and cooling fluid pressure system 13 exceeds the operating fluid pressure at the third operating fluid pressure connection 32 of the switching valve 15 the non-return valve 18 closes and separates the operating fluid pressure connection 32 and the lubricating and cooling fluid pressure system 13 from each other.

In an operating state in which the first operating fluid pressure source 11 provides a low operating fluid excess quantity the first switching unit 21 separates the first operating fluid pressure source 11 and the lubricating and cooling fluid pressure system 13 essentially from each other. If the working fluid pressure system 10 in such an operating state has an operating fluid pressure which lies above the threshold value of the switching valve 15 the second switching unit 14 connects the second operating fluid pressure source 12 directly to the lubricating and cooling fluid pressure system 13 and the second operating fluid pressure source 12 can increase the operating fluid pressure in the lubricating and cooling pressure system 13. An operating fluid flow from the lubricating and cooling fluid pressure system 13 into the working fluid pressure system 10 is prevented by the second non-return valve 18.

If the working pressure system 10 has, in the operating state in which the first operating fluid pressure source 11 provides a low operating fluid excess quantity, an operating fluid pressure which lies below the threshold value of the switching valve 15, the second switching unit 14 switches into the first switching position, in which the second operating fluid pressure source 12 is connected merely to the working fluid pressure system 10. In this operating state the second operating fluid pressure source 12 can increase the operating fluid pressure in the working fluid pressure system 10, whereby the operating fluid excess quantity in the working fluid pressure system 10 is also increased. By means of the operating fluid pressure in the working fluid pressure system 10 the second operating fluid pressure source 12 can thus indirectly increase the operating fluid pressure in the lubricating and cooling fluid pressure system 13.

In an operating state in which the first operating fluid pressure source 11 provides a high operating fluid excess quantity the first switching unit 21 connects the first operating fluid pressure source 11 and the lubricating and cooling fluid pressure system 13 to each other. In such an operating state the second operating fluid pressure source 12 can support the first operating fluid pressure source 11. In case of an adequate operating fluid supply by the first operating fluid pressure source a speed of the second operating fluid pressure source 12 is reduced in such an operating state. The working fluid pressure system 10 and the lubricating and cooling fluid pressure system 13 are then essentially supplied by means of the first operating fluid pressure source 11.

In order to adjust the second operating fluid pressure source 12 the drive train device comprises a control and regulating unit 19. With the control and regulating unit 19 the operating fluid pressure of the second operating fluid pressure source 12 is adjusted in dependence upon a requirement performance graph. The requirement performance graph is stored in a memory unit of the control and regulating unit 19. The requirement performance graph describes the operating fluid excess quantity in dependence upon a current operating state. The operating state depends essentially on a speed of the internal combustion engine 27 and/or the hybrid drive unit 26 and on a driving torque output of the internal combustion engine 27 and/or the hybrid drive unit 26. The speed necessitates an operating fluid pressure and an operating fluid quantity which is provided by the first operating fluid pressure source 11. The driving torque gives rise to an operating fluid requirement of the gear switching units of the transmission 25. The control and regulating unit 19 adjusts a speed, by which the second operating fluid pressure source 12 is affected impacted, in depending on the requirement performance graph.

In order to provide a parameter for an adaptation of the requirement performance graph the lubricating and cooling fluid low pressure system 23 comprises a sensor unit 20. The sensor unit 20 comprises a pressure sensor 35. The control and regulating unit 19 evaluates the parameter provided by the sensor unit 20 and adapts the requirement performance graph in depending on the parameter for adjustment of the second operating fluid pressure source 12.

What is claimed is:

1. A drive train device including a working fluid pressure system (10) for providing an operating fluid pressure with at least a first and a second operating fluid pressure source (11, 12) connected in at least one operating state both directly to the working pressure fluid system (10), and with a lubricating and cooling fluid pressure system (13) providing an operating fluid pressure in the lubricating and cooling fluid pressure system (13) deviating from the operating fluid pressure in the working fluid pressure system (10), and a hydraulic switching unit (14) provided for connecting, in at least one operating state, the second operating fluid pressure source (12) directly to the lubricating and cooling fluid pressure system (13), the hydraulic switching unit (14) comprising a switching valve (15) for connecting the second operating fluid pressure source (12) depending on an operating fluid pressure in the working fluid pressure system (10) directly to the lubricating and cooling fluid pressure system (13), a non-return valve (17) arranged between the working fluid pressure system (10) and the switching valve (15) for preventing an operating fluid flow in the direction toward the switching valve (15) when both the first and second operating fluid pressure sources are connected to the working fluid pressure system (10).

2. The drive train device according to claim 1, wherein the switching valve (15) is provided for connecting the second operating fluid pressure source (12) permanently directly to the working fluid pressure system (10).

3. The drive train device according to claim 1, wherein the switching valve (15) is provided for connecting the second operating fluid pressure source (12) in a switchable manner directly to the lubricating and cooling fluid pressure system (13).

4. The drive train device according to claim 1, wherein the switching valve (15) is an automatic switching valve.

5. The drive train device according to claim 1, wherein the hydraulic switching unit (14) comprises a valve spring adjusting means (16) for adjusting a threshold pressure for the switching of the switching valve (15).

6. The drive train device according to claim 1, wherein the switching unit (14) comprises at least one non-return valve (18) arranged between the lubricating and cooling fluid pressure system (13) and the switching valve (15), the non-return valve (18) being provided to prevent an operating fluid flow in the direction toward the switching valve (15).

7. The drive train device according to claim 1, wherein the second operating fluid pressure source (12) is in the form of an independently driven operating fluid pump for providing a controllable operating fluid pressure.

8. The drive train device according to claim 1, including control unit (19) for adjusting an operating fluid pressure of the second operating fluid pressure source (12) in depending on a requirement performance graph.

9. The drive train device according to claim 8, wherein the control unit (19) is provided to adapt the requirement performance graph in relation to a status change to the lubricating and cooling fluid pressure system (13).

10. The drive train device according to claim 9, including a sensor unit (20) for providing a parameter for the adaptation of the requirement performance graph.

11. The drive train device according to claim 1, including a further hydraulic switching unit (21) for supplying an operating fluid excess quantity of the working fluid pressure system (10) to the lubricating and cooling fluid pressure system (13).

12. The drive train device according to claim 1, including a hydraulic lubricating fluid pressure regulating valve (22) for connecting a lubricating and cooling fluid low pressure system (23) to the lubricating and cooling fluid pressure system (13).

13. A method for operating a drive train device with a working pressure fluid system (10) for providing an operating fluid pressure, with at least a first and a second operating fluid pressure source (11, 12) connected in at least one operating state both directly to the working pressure fluid system (10), and with a lubricating and cooling fluid pressure system (13) provided for an operating fluid pressure in the lubricating and cooling fluid pressure system (13) deviating from the operating fluid pressure in the working fluid pressure system (10), with the second operating fluid pressure source (12) being directly connected to the lubricating and cooling fluid pressure system (13) by a hydraulic switching unit (14) comprising a switching valve (15) in at least one operating state, said method comprising the step of connecting also the second operating fluid pressure source (12) in dependence upon an operating fluid pressure in the working fluid pressure system (10) directly to the lubricating and cooling fluid pressure system (13) for enhancing the fluid pressure while at the same time preventing fluid flow in the direction toward the switching valve (15).

* * * * *